(12) United States Patent
Kidamura

(10) Patent No.: US 9,086,963 B2
(45) Date of Patent: Jul. 21, 2015

(54) SYSTEM AND DEFECT POSITION SPECIFYING METHOD

(71) Applicant: FUJITSU LIMITED, Kawasaki-shi, Kanagawa (JP)

(72) Inventor: Takashi Kidamura, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 13/929,187

(22) Filed: Jun. 27, 2013

(65) Prior Publication Data
US 2014/0006873 A1    Jan. 2, 2014

(30) Foreign Application Priority Data
Jun. 29, 2012  (JP) ................................. 2012-147931

(51) Int. Cl.
G06F 11/00   (2006.01)
G06F 11/07   (2006.01)

(52) U.S. Cl.
CPC ........ G06F 11/0727 (2013.01); G06F 11/0751 (2013.01)

(58) Field of Classification Search
CPC ....................................... G06F 11/07
USPC ............................................ 714/42, 47.1, 54
See application file for complete search history.

(56) References Cited

U.S. PATENT DOCUMENTS 7,249,289 B2 *   7/2007  Muranaka et al. ............... 714/48
8,065,481 B1 *  11/2011  Hiller et al. .................... 711/114
2007/0002847 A1 *  1/2007  Inamura et al. ................ 370/360

FOREIGN PATENT DOCUMENTS

JP    11-143783    5/1999
JP   2001-005743   1/2001

* cited by examiner

*Primary Examiner* — Dieu-Minh Le
(74) *Attorney, Agent, or Firm* — Staas & Halsey LLP (57) ABSTRACT

There is provided a system that includes a first apparatus and a second apparatus configured to perform communication therebetween using a signal line, wherein the first apparatus includes a holding section configured to hold a signal level of a signal outputted from the second apparatus using the signal line, and the second apparatus includes, a detection section configured to detect a failure in which a signal level does not change from a certain signal level when the detection section detects that the signal level is not correspondent with a predetermined level, the signal level being held in the holding section after a signal of the predetermined level is inputted to the signal line by the second apparatus.

6 Claims, 10 Drawing Sheets

SYSTEM AND DEFECT POSITION SPECIFYING METHOD

CROSS-REFERENCE TO RELATED APPLICATION

This application is based upon and claims the benefit of priority of the prior Japanese Patent Application No. 2012-147931 filed on Jun. 29, 2012, the entire contents of which are incorporated herein by reference.

FIELD

The embodiments discussed herein are related to a system and a defect position specifying method.

BACKGROUND

In redundant arrays of inexpensive disks (RAID) system, a device called a service controller (SVC) that monitors the state of a RAID apparatus and performs control according to the state is provided therein.

The SVC includes a micro-processing unit (MPU) that controls the SVC and a field programmable gate array (FPGA) that supports control performed by the SVC. The SVCs are used in a redundant form. When an FPGA of an SVC of one system detects a defect in an SVC of the other system, the SVC which has detected the defect transmits a signal (which will be hereinafter referred to as an "initialization signal") that prompts initialization to the SVC whose defect has been detected. In this case, the FPGA of the SVC which has detected the defect transmits a high-level signal as the initialization signal using a predetermined signal line, and transmits a low-level signal as the initialization signal using another signal line. In the SVC whose defect has been detected, the FPGA which has received the initialization signal initializes its own SVC and notifies the MPU that the FPGA has received the initialization signal by an interrupt. Then, the MPU which has received the interrupt performs interrupt processing and does not perform control of the RAID apparatus until initialization is performed. Note that, when the SVC of the one system does not detect any defect in the SVC of the other system, the SVC of the one system transmits a low level signal as a signal of a normal state using the one signal line which is used for transmitting the initialization signal, and transmits a high level signal as a signal of a normal state using the other signal line.

Japanese Laid-open Patent Publication No. 2001-5743 and Japanese Laid-open Patent Publication No. 11-143783 are examples of the related art.

SUMMARY

According to an aspect of the invention, a system includes a first apparatus and a second apparatus configured to perform communication therebetween using a signal line, wherein the first apparatus includes a holding section configured to hold a signal level of a signal outputted from the second apparatus using the signal line, and the second apparatus includes a detection section configured to detect a failure in which a signal level does not change from a certain signal level when the detection section detects that the signal level is not correspondent with a predetermined level, the signal level being held in the holding section after a signal of the predetermined level is inputted to the signal line by the second apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preliminary Consideration

In the conventional RAID system described in BACKGROUND, there is a problem that, when a failure occurs in which a signal on the signal line is stuck at a predetermined level while the RAID apparatus is operating, the SVC may not be able to detect the failure. For example, there might be cases where, even when the SVC of one system detects a defect in the SVC of the other system and then transmits a high level signal as an initialization signal to the SVC of the other system, the SVC of the other system receives a low level signal. The SVC of the other system may not be able to determine that the received signal is a signal (which will be hereinafter referred to as "a low-level stuck signal") which does not change from the low level, and thus, may not be able to detect a failure in which the signal is stuck at the low level. Similarly, there might be cases where, even when the SVC of one system detects a defect in the SVC of the other system and then transmits a low level signal as an initialization signal, the SVC of the other system receives a high level signal. The SVC may not be able to determine that the received signal is a signal (which will be hereinafter referred to as a "high-level stuck signal") which does not change from the high level, and thus, may not be able to detect a failure in which the signal is stuck at the high level. Accordingly, even when there is a failure in the SVC of the other system, the SVC may not be able to perform initialization on the basis of the initialization signal, and thus, the operation of the RAID apparatus might be adversely affected.

Note that the above-described problem occurs not only in the RAID system, but also in any system in which duplicated apparatuses or redundant apparatuses communicate with each other using a signal.

Therefore, it is desired that a defect in which a signal on a signal line does not change from a predetermined level may be detected while the system is operated.

Hereinafter, embodiments of a system and a defect position specifying method according to aspects of the present disclosure will be described in detail with reference to the accompanying drawings. Note that the embodiments do not intend to limit the scope of the invention. Examples in which aspects of the present disclosure are applied to a RAID system will be hereinafter described.

First Embodiment

Configuration of Raid System

Figure 1:
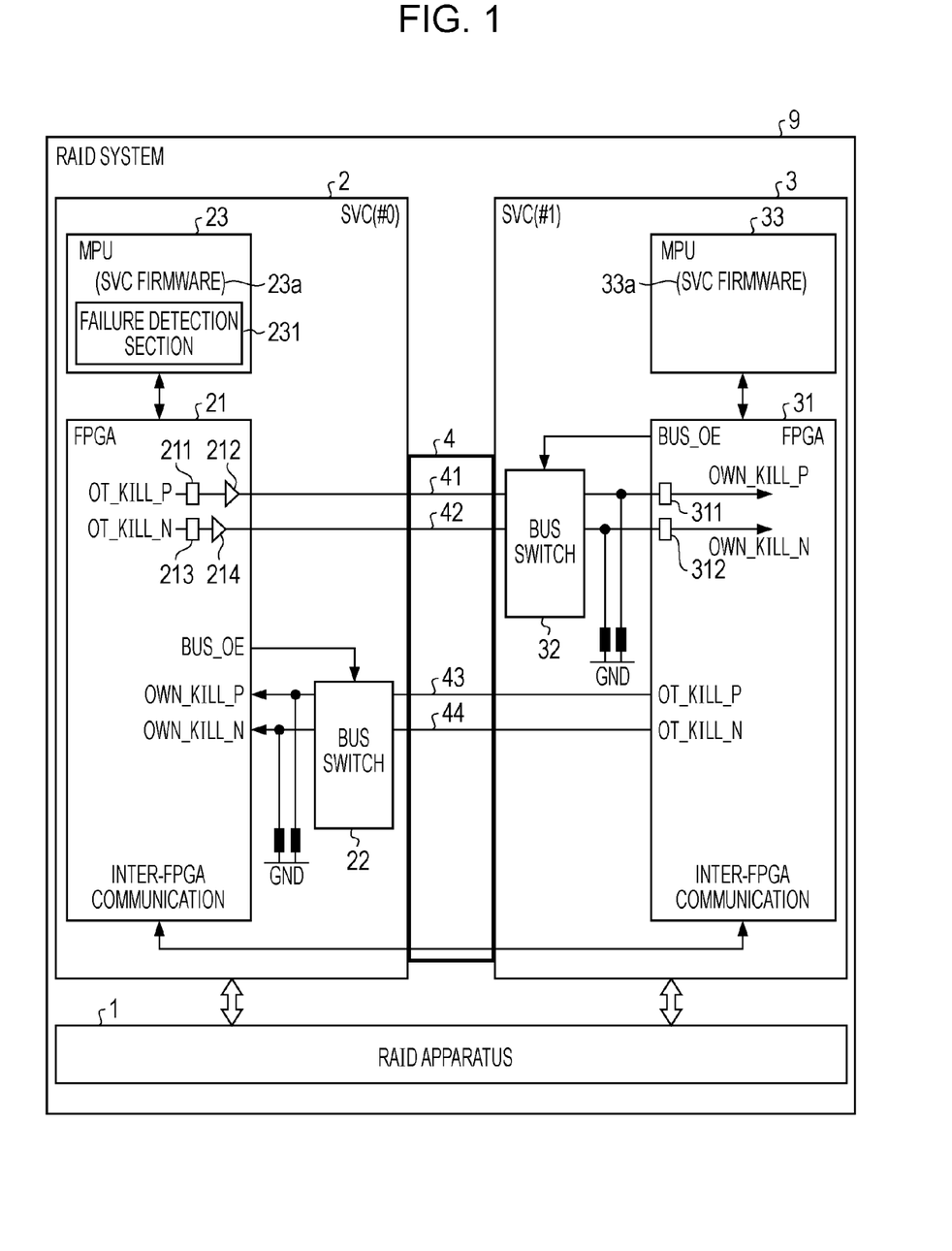
FIG. 1 is a diagram illustrating a hardware configuration of a RAID system according to a first embodiment.

FIG. 1 is a diagram illustrating a hardware configuration of a RAID system according to a first embodiment. As illustrated in FIG. 1, a RAID system 9 includes a RAID apparatus 1, a plurality of service controllers (SVCs) 2 and 3, and a connecter 4. The RAID apparatus 1 manages a hard disk drive (HDD). The SVCs 2 and 3 are duplicated apparatuses, and in FIG. 1, the SVC 2 of a 0 system and the SVC 3 of a 1 system are connected to each other via the connecter 4.

The SVCs 2 and 3 monitor the state of the RAID apparatus 1 and perform control over the RAID apparatus 1 according to the state thereof. For example, the SVCs 2 and 3 perform power supply control and temperature control over the RAID apparatus 1. Also, the SVCs 2 and 3, which are different systems, monitor each other's states to control each other in accordance with the each other's states.

The SVC 2 includes an FPGA 21, a bus switch 22, and an MPU 23. The FPGA 21 is an integrated circuit that supports control of the SVC 2. The bus switch 22 turns on and off output of a signal passing through a bus line (a signal line) toward the FPGA 21. That is, the bus switch 22 switches the state of the signal line at the FPGA 21 side between a state (a connection state) where a signal passes through the signal line and a state (a disconnection state) where a signal does not pass through the signal line. The MPU 23 includes an internal memory for storing a program in which various processing procedures are defined, and control data, etc., and executes various types of processing using the program and the control data, etc. For example, the MPU 23 executes various types of processing by using SVC firmware 23a.

The FPGA 21 performs inter-FPGA communication with the SVC 3 of the other system. Using the inter-FPGA communication, the SVC firmware 23a performs mutual communication with the SVC 3. For example, when the SVC firmware 23a detects a defect in the SVC 3 by the inter-FPGA communication, the SVC firmware 23a causes the FPGA21 to output a signal (which will be hereinafter referred to as an "initialization signal") to SVC 3 to prompt initialization.

When there is a defect in the SVC 3 of the other system, the FPGA 21 outputs an initialization signal to the SVC 3. The initialization signal is outputted using two signal lines 41 and 42 connecting the FPGAs of the SVCs 2 and 3 to each other. A signal having a voltage which represents a high level is outputted as an initialization signal to the signal line 41. The term "high level" herein means, for example, "1." The signal outputted using the signal line 41 will be hereinafter referred to as an "OT_KILL_P signal." On the other hand, a signal having a voltage which represents a low level is outputted as an initialization signal to the signal line 42. The term "low level" herein means, for example, "0." The signal outputted using the signal line 42 will be hereinafter referred to as an "OT_KILL_N signal." Note that, when the SVC 3 of the other system is normal, the OT_KILL_P signal as a low voltage level is outputted to the signal line 41, and the OT_KILL_N signal as a high voltage level is outputted to the signal line 42.

A control register 211 and a buffer 212 are connected to the signal line 41 as illustrated in FIG. 1. The control register 211 is used when the OT_KILL_P signal is controlled by the SVC firmware 23a. The buffer 212 is used when the voltage of an entire transmission path of the signal line 41 is raised such that a sufficient amount of current passes therethrough.

A control register 213 and a buffer 214 are connected to the signal line 42 as illustrated in FIG. 1. The control register 213 is used when the OT_KILL_N signal is controlled by the SVC firmware 23a. The buffer 214 is used when the voltage of an entire transmission path of the signal line 42 is raised such that a sufficient amount of current passes therethrough.

When there is a defect in its own system, the FPGA 21 receives an initialization signal that prompts initialization of its own system from the SVC 3 of the other system. The initialization signal is received using two signal lines 43 and 44 connecting the FPGAs of the SVCs 2 and 3. The signal received using the signal line 43 will be hereinafter referred to as an "OWN_KILL_P signal." The signal received using the signal line 44 will be hereinafter referred to as an "OWN_KILL_N signal." That is, the OWN_KILL_P signal serving as an initialization signal is a signal having a voltage which represents the high level, and the OWN_KILL_N signal serving as an initialization signal is a signal having a voltage which represents the low level.

The FPGA 21 communicates with the bus switch 22. Using this communication, the SVC firmware 23a controls the bus switch 22. For example, to put the bus switch 22 into a connection state, the SVC firmware 23a causes the FPGA 21 to receive a signal having a voltage which represents the high level. On the other hand, to put the bus switch 22 into a disconnection state, the SVC firmware 23a causes the FPGA 21 to receive a signal having a voltage which represents the low level. A signal which is received through the above-described communication will be hereinafter referred to as a "BUS_OE signal." Note that each of the signal lines 43 and 44 is connected to the ground at a point between the FPGA 21 and the bus switch 22.

The SVC 3 includes an FPGA 31, a bus switch 32, and an MPU 33. The FPGA 31 is an integrated circuit that supports control of the SVC 3. The bus switch 32 turns on and off output of a signal passing through a bus line (a signal line) toward the FPGA 31. That is, the bus switch 32 switches the state of the signal line at the FPGA 31 side between a state (a connection state) where a signal passes through the signal line and a state (a disconnection state) where a signal does not pass through the signal line. The MPU 33 is a chip that controls the SVC 3. The MPU 33 includes an internal memory for storing a program in which various processing procedures are defined, and control data, etc., and executes various types of processing using the program and the control data, etc. For example, the MPU 33 executes various types of processing by using SVC firmware 33a.

The FPGA 31 performs inter-FPGA communication with the SVC 2 of the other system. Using the inter-FPGA communication, the SVC firmware 33a performs mutual communication with the SVC 2.

When there is a defect in its own system, the FPGA 31 receives an initialization signal that prompts initialization of its own system from the SVC 2 of the other system. The initialization signal is received using the two signal lines 41 and 42 connecting the FPGAs of the SVCs 2 and 3. The signal received using the signal line 41 is the "OWN_KILL_P signal." The signal received using the signal line 42 is the "OWN_KILL_N signal." That is, the OWN_KILL_P signal serving as an initialization signal is a signal having a voltage which represents the high level, and the OWN_KILL_N signal serving as an initialization signal is a signal having a voltage which represents the low level.

A state register 311 is provided on the signal line 41. The state register 311 holds the signal level of the signal line 41. That is, the state register 311 holds the signal state of the OWN_KILL_P signal. Using the state register 311, the SVC firmware 33*a* refers to the OWN_KILL_P signal. A state register 312 is provided on the signal line 42. The state register 312 holds the signal level of the signal line 42. That is, the state register 312 holds the signal level of the OWN_KILL_N signal. Using the state register 312, the SVC firmware 33*a* refers to the OWN_KILL_N signal.

The FPGA 31 communicates with the bus switch 32. Using this communication, the SVC firmware 33*a* controls the bus switch 32. For example, to put the bus switch 32 into a connection state, the SVC firmware 33*a* causes the FPGA 31 to receive the BUS_OE signal having a voltage which represents the high level. On the other hand, to put the bus switch 32 into a disconnection state, the SVC firmware 33*a* causes the FPGA 31 to receive the BUS_OE signal having a voltage which represents the low level. Note that each of the signal lines 41 and 42 is connected to the ground at a point between the bus switch 32 and the FPGA 31.

The MPU 23 includes a failure detection section 231. The failure detection section 231 detects a circuit failure regarding the OT_KILL_P signal and the OT_KILL_N signal in which a signal is stuck at a particular signal level. Note that the failure detection section 231 tries to execute failure detection on a periodic or non-periodic basis.

For example, the failure detection section 231 inputs a signal having a high-level voltage to the signal line 41 using the control register 211. That is, the failure detection section 231 controls the OT_KILL_P signal to the high level. The failure detection section 231 then determines whether or not the signal level of the signal held in the state register 311 that holds the state level of the OWN_KILL_P signal in the SVC 3 matches the high level, which is the inputted signal level. When the signal level of the signal held in the state register 311 is the low level and does not match the inputted signal level (the high level), the failure detection section 231 detects that there is a circuit failure in which a signal is stuck at the low level. That is, the failure detection section 231 detects a circuit failure in which the OT_KILL_P signal is stuck at the low level.

On the other hand, when the signal level of the signal held in the state register 311 is the high level and matches the inputted signal level (the high level), the failure detection section 231 further inputs a signal having a low level voltage to the signal line 41 using the control register 211. That is, the failure detection section 231 controls the OT_KILL_P signal to the low level. The failure detection section 231 then determines whether or not the signal level of the signal held in the state register 311 that holds the state level of the OWN_KILL_P signal in the SVC 3 matches the low level, which is the inputted signal level. When the signal level of the signal held in the state register 311 is the high level and does not match the inputted signal level (the low level), the failure detection section 231 detects that there is a circuit failure in which a signal is stuck at the high level. That is, the failure detection section 231 detects a circuit failure in which the OT_KILL_P signal is stuck at the high level. On the other hand, when the signal level of the signal held in the state register 311 is the low level and matches the inputted signal level (the low level), the failure detection section 231 detects that the OT_KILL_P signal and the OWN_KILL_P signal are normal.

Note that detection of a circuit failure of the OT_KILL_P signal by the failure detection section 231 has been described, and detection of a circuit failure of the OT_KILL_N signal is performed following a similar flow to that described above. Therefore, the description thereof will be omitted.

Sequence of Circuit Failure Detection Regarding OT_KILL_P Signal

Figure 2:
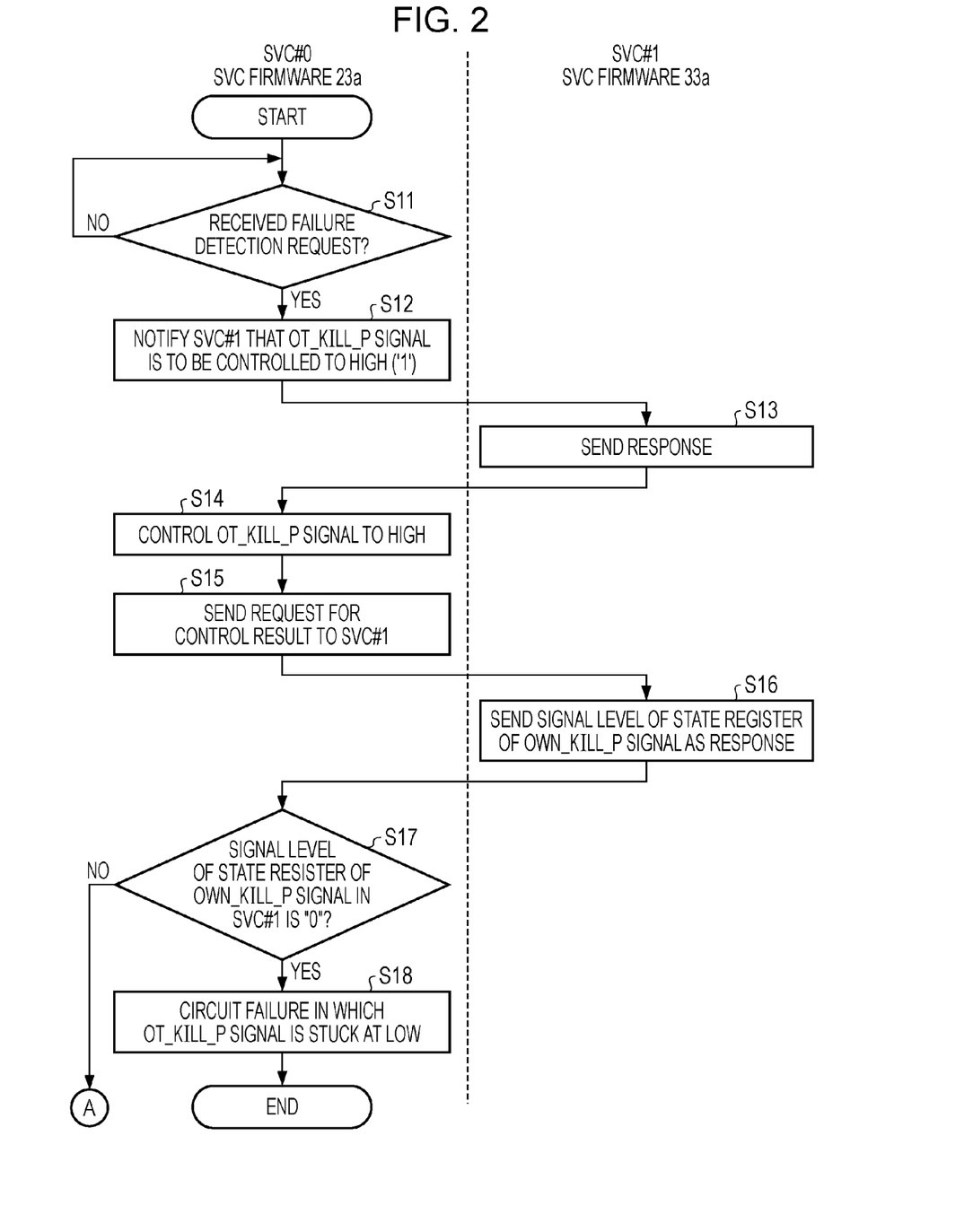
FIG. 2 is a diagram illustrating a sequence of circuit failure detection regarding OT_KILL_P signal.
Figure 3:
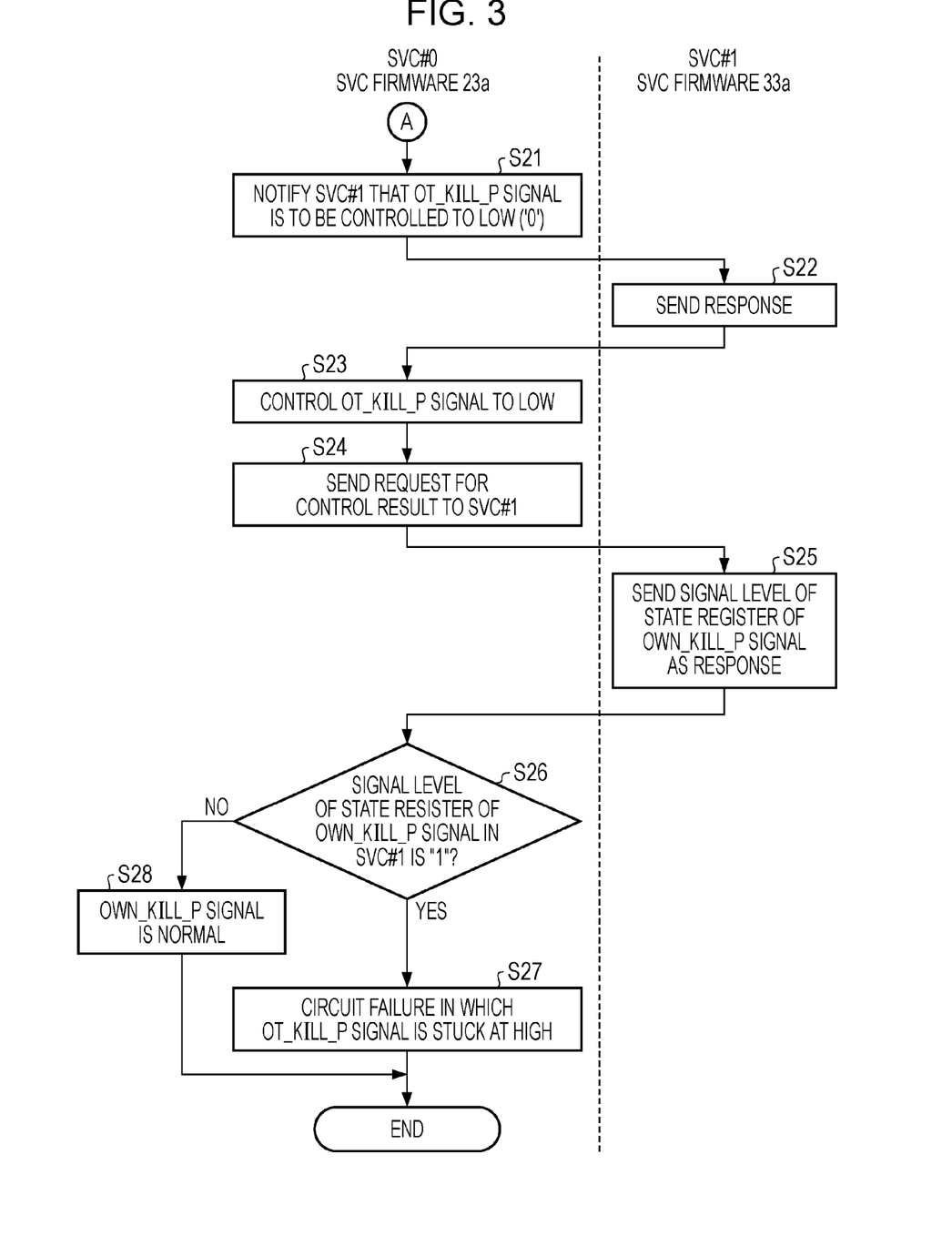
FIG. 3 is a diagram illustrating another sequence of circuit failure detection regarding OT_KILL_P signal.

Next, a sequence of circuit failure detection regarding the OT_KILL_P signal performed in the RAID system 9 according to the first embodiment will be described with reference to FIG. 2 and FIG. 3. FIG. 2 and FIG. 3 are diagrams illustrating sequences of circuit failure detection regarding the OT_KILL_P signal. Note that, in FIG. 2 and FIG. 3, the SVC 2 is denoted by SCV#0 and the SVC 3 is denoted by SVC#1, the descriptions of which will be given below. Also, in FIG. 2 and FIG. 3, the state in which a voltage represents the high level is denoted by "HIGH" in short, and the state in which a voltage represents the low level is denoted by "LOW" in short.

First, in SVC#0, the SVC firmware 23*a* (the failure detection section 231) determines whether or not a failure detection request has been received (Step S11). When the SVC firmware 23*a* determines that the failure detection request has not been received (NO in Step S11), it repeats the detection processing until the failure detection request is received.

On the other hand, when the SVC firmware 23*a* determines that the failure detection request has been received (YES in Step S11), it notifies the SVC#1 that the OT_KILL_P signal is to be controlled to HIGH (for example, "1") (Step S12). In this case, the SVC firmware 23*a* gives the notice to the SVC#1 using inter-FPGA communication.

Then, in the SVC#1, the SVC firmware 33*a* receives the notice from the SVC#0 and returns a response (Step S13). In this case, the SVC firmware 33*a* returns an affirmative response to the notice that the OT_KILL_P signal is to be controlled to HIGH.

Subsequently, in the SVC#0, the SVC firmware 23*a* controls the OT_KILL_P signal to HIGH (Step S14). For example, the SVC firmware 23*a* inputs HIGH to the signal line 41 using the control register 211. Then, the SVC firmware 23*a* gives a request for a control result to the SVC#1 using inter-FPGA communication (Step S15).

In the SVC#1, the SVC firmware 33*a* returns as a response the signal level of the state register 311 of the OWN_KILL_P signal (Step S16).

In the SVC#0, the SVC firmware 23*a* determines whether or not the signal level in the state register 311 for the OWN_KILL_P signal in the SVC#1 is "0" (Step S17). When the SVC firmware 23*a* determines that the signal level in the state register 311 for OWN_KILL_P signal in the SVC#1 is "0" (YES in Step S17), the SVC firmware 23*a* detects that there is a circuit failure in which the OT_KILL_P signal is stuck at LOW (Step S18). That is, the signal level held in the state register 311 is LOW and does not match HIGH inputted as the OT_KILL_P signal, and thus, the SVC firmware 23*a* detects that there is a circuit failure in which the OT_KILL_P signal is stuck at LOW.

On the other hand, when the SVC firmware 23*a* determines that the signal level in the state register 311 for OWN_KILL_P signal in the SVC#1 is not "0" (NO in Step S17), the operation of the SVC firmware 23*a* moves to Steps S21. That is, the signal level held in the state register 311 is HIGH and matches HIGH inputted as the OT_KILL_P signal, and thus, the operation of the SVC firmware 23a shifts to the next step.

In Step S21, the SVC firmware 23a notifies the SVC#1 that the OT_KILL_P signal is to be controlled to LOW (for example, "0") (Step S21). In this case, the SVC firmware 23a gives the notice to the SVC#1 using inter-FPGA communication.

Then, in the SVC#1, the SVC firmware 33a receives the notice from the SVC#0 and returns a response (Step S22). In this case, the SVC firmware 33a returns an affirmative response to the notice that the OT_KILL_P signal is to be controlled to LOW.

Subsequently, in the SVC#0, the SVC firmware 23a controls the OT_KILL_P signal to LOW (Step S23). For example, the SVC firmware 23a inputs LOW to the signal line 41 using the control register 211. Then, the SVC firmware 23a gives a request for a control result to the SVC#1 using inter-FPGA communication (Step S24).

In the SVC#1, the SVC firmware 33a returns as a response the signal level of the state register 311 of the OWN_KILL_P signal (Step S25).

In the SVC#0, the SVC firmware 23a determines whether or not the signal level in the state register 311 for the OWN_KILL_P signal in the SVC#1 is "1" (Step S26). When the SVC firmware 23a determines that the signal level of the state register 311 of OWN_KILL_P signal in the SVC#1 is "1" (YES in Step S26), the SVC firmware 23a detects that there is a circuit failure in which the OT_KILL_P signal is stuck at HIGH (Step S27). That is, the signal level of the signal held in the state register 311 is HIGH and does not match LOW inputted as the OT_KILL_P signal, and thus, the SVC firmware 23a detects that there is a circuit failure in which the OT_KILL_P signal is stuck at HIGH. Then, the SVC firmware 23a ends the circuit failure detection regarding the OT_KILL_P signal.

On the other hand, when the SVC firmware 23a determines that the signal level of the state register 311 of OWN_KILL_P signal in the SVC#1 is not "1" (NO in Step S26), it detects that the OWN_KILL_P signal is normal (Step S28). Then, the SVC firmware 23a ends the circuit failure detection processing regarding the OT_KILL_P signal.

Sequence of Circuit Failure Detection Regarding OT_KILL_N Signal

Figure 4:
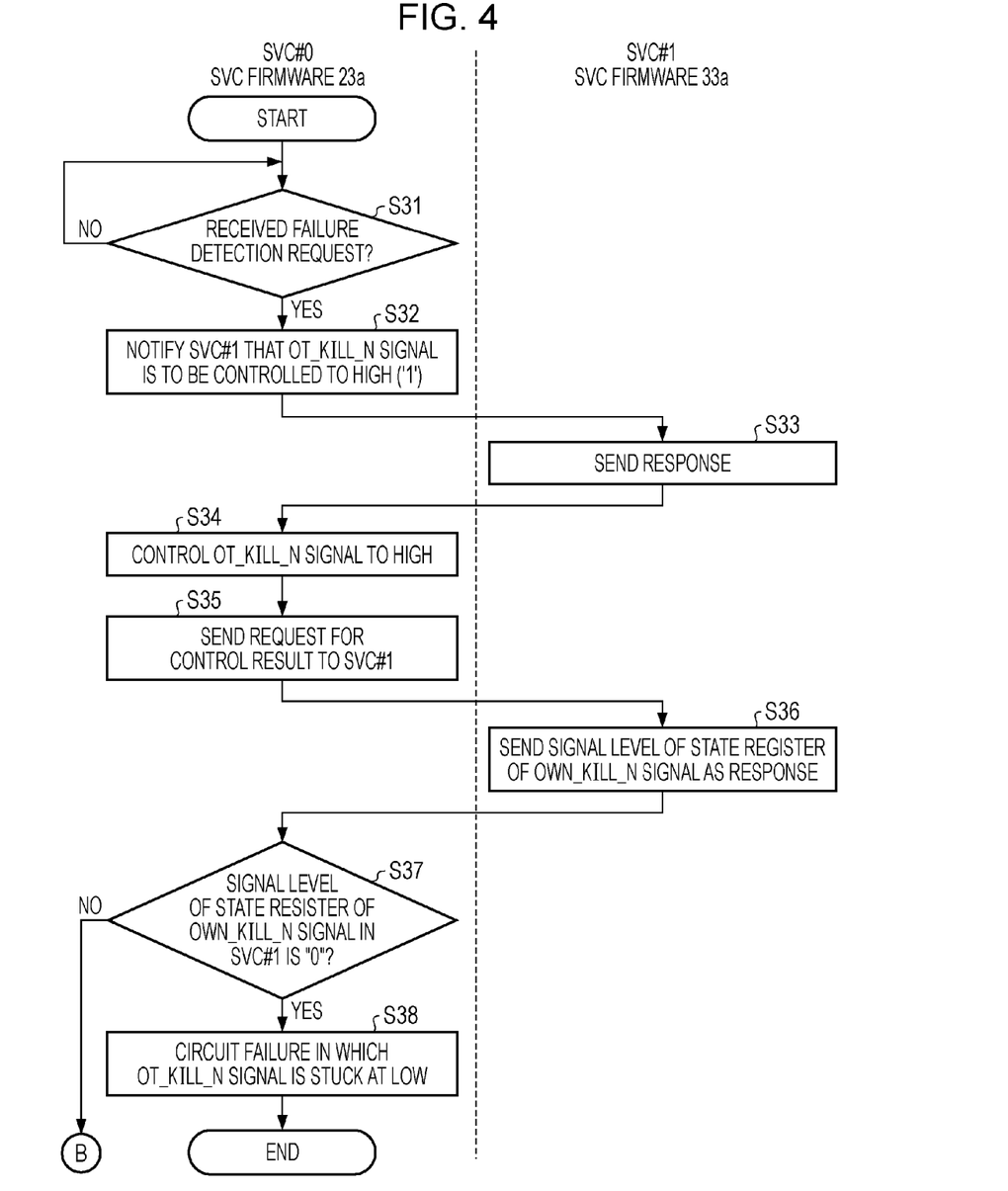
FIG. 4 is a diagram illustrating a sequence of circuit failure detection regarding OT_KILL_N signal.
Figure 5:
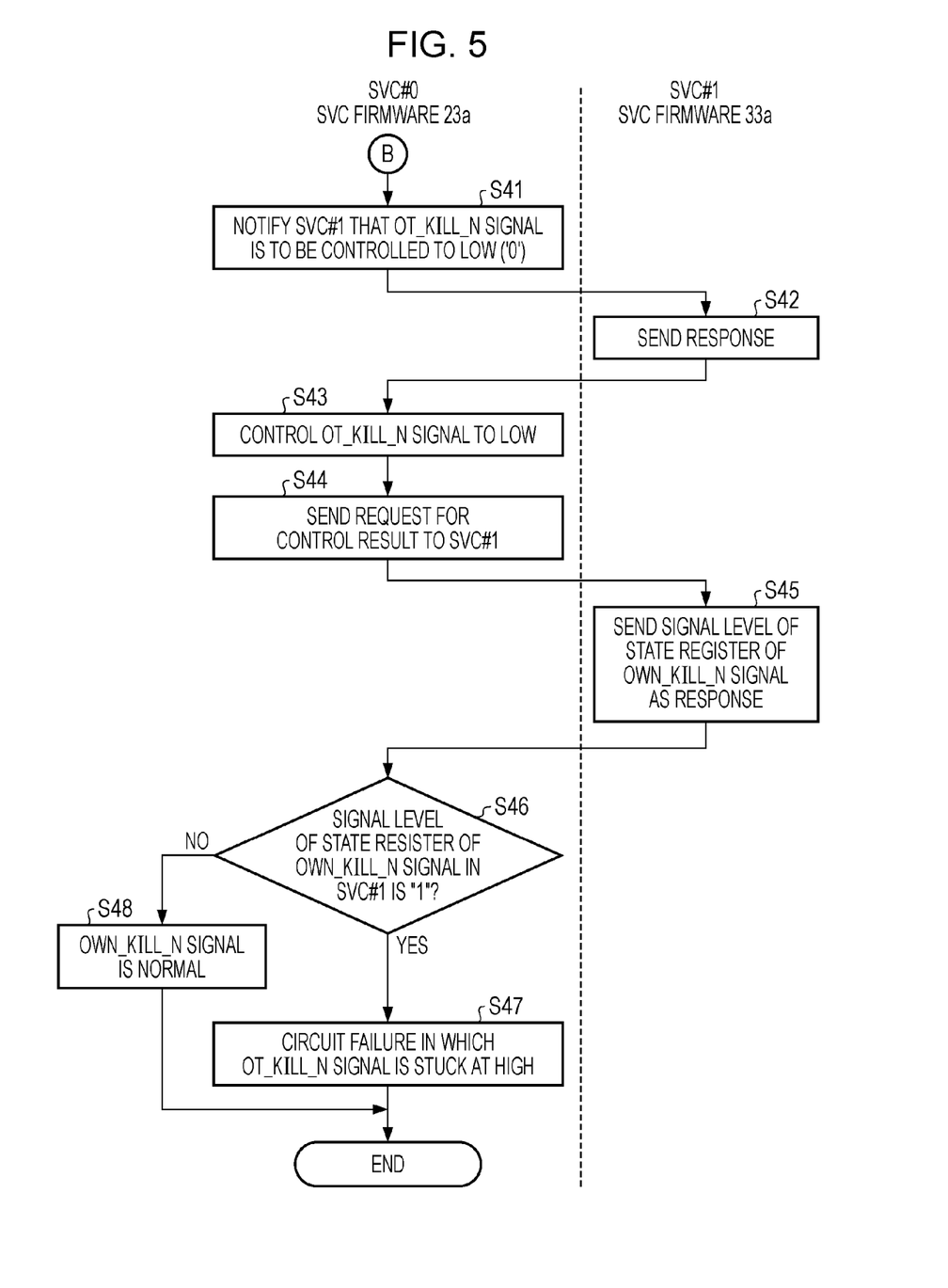
FIG. 5 is a diagram illustrating another sequence of circuit failure detection regarding OT_KILL_N signal.

Next, a sequence of circuit failure detection regarding the OT_KILL_N signal performed in the RAID system 9 according to the first embodiment will be described with reference to FIG. 4 and FIG. 5. FIG. 4 and FIG. 5 are diagrams illustrating sequences of circuit failure detection regarding the OT_KILL_N signal. Note that, in FIG. 4 and FIG. 5, the SVC 2 is denoted by SCV#0 and the SVC 3 is denoted by SVC#1, the descriptions of which will be given below. Also, in FIG. 4 and FIG. 5, the state in which a voltage represents the high level is denoted by "HIGH" in short, and the state in which a voltage represents the low level is denoted by "LOW" in short.

First, in SVC#0, the SVC firmware 23a (the failure detection section 231) determines whether or not a failure detection request has been received (Step S31). When the SVC firmware 23a determines that the failure detection request has not been received (NO in Step S31), it repeats the detection processing until the failure detection request is received.

On the other hand, when the SVC firmware 23a determines that the failure detection request has been received (YES in Step S31), the SVC firmware 23a notifies the SVC#1 that the OT_KILL_N signal is to be controlled to HIGH (for example, "1") (Step S32). In this case, the SVC firmware 23a gives the notice to the SVC#1 using inter-FPGA communication.

Then, in the SVC#1, the SVC firmware 33a receives the notice from the SVC#0 and returns a response (Step S33). In this case, the SVC firmware 33a returns an affirmative response to the notice that the OT_KILL_N signal is to be controlled to HIGH.

Subsequently, in the SVC#0, the SVC firmware 23a controls the OT_KILL_N signal to HIGH (Step S34). For example, the SVC firmware 23a inputs HIGH to the signal line 42 using the control register 213. Then, the SVC firmware 23a gives a request for a control result to the SVC#1 using inter-FPGA communication (Step S35).

In the SVC#1, the SVC firmware 33a returns as a response the signal level in the state register 312 for the OWN_KILL_N signal (Step S36).

In the SVC#0, the SVC firmware 23a determines whether or not the signal level in the state register 312 for the OWN_KILL_N signal in the SVC#1 is "0" (Step S37). When the SVC firmware 23a determines that the signal level in the state register 312 for OWN_KILL_N signal in the SVC#1 is "0" (YES in Step S37), the SVC firmware 23a detects that there is a circuit failure in which the OT_KILL_N signal is stuck at LOW (Step S38). That is, the signal level held in the state register 312 is LOW and does not match HIGH inputted as the OT_KILL_N signal, and thus, the SVC firmware 23a detects that there is a circuit failure in which the OT_KILL_N signal is stuck at LOW.

On the other hand, when the SVC firmware 23a determines that the signal level in the state register 312 for OWN_KILL_N signal in the SVC#1 is not "0" (NO in Step S37), the operation of the SVC firmware 23a moves to Steps S41. That is, the signal level of the signal held in the state register 312 is HIGH and matches HIGH inputted as the OT_KILL_N signal, and thus, the operation of the SVC firmware 23a shifts to the next step.

In Step S41, the SVC firmware 23a notifies the SVC#1 that the OT_KILL_N signal is to be controlled to LOW (for example, "0") (Step S41). In this case, the SVC firmware 23a gives the notice to the SVC#1 using inter-FPGA communication.

Then, in the SVC#1, the SVC firmware 33a receives the notice from the SVC#0 and returns a response (Step S42). In this case, the SVC firmware 33a returns an affirmative response to the notice that the OT_KILL_N signal is to be controlled to LOW.

Subsequently, in the SVC#0, the SVC firmware 23a controls the OT_KILL_N signal to LOW (Step S43). For example, the SVC firmware 23a inputs LOW to the signal line 42 using the control register 213. Then, the SVC firmware 23a gives a request for a control result to the SVC#1 using inter-FPGA communication (Step S44).

In the SVC#1, the SVC firmware 33a returns as a response the signal level of the state register 312 of the OWN_KILL_N signal (Step S45).

In the SVC#0, the SVC firmware 23a determines whether or not the signal level in the state register 312 for the OWN_KILL_N signal in the SVC#1 is "1" (Step S46). When the SVC firmware 23a determines that the signal level of the state register 312 of OWN_KILL_N signal in the SVC#1 is "1" (YES in Step S46), the SVC firmware 23a detects that there is a circuit failure in which the OT_KILL_N signal is stuck at HIGH (Step S47). That is, the signal level held in the state register 312 is HIGH and does not match LOW inputted as the OT_KILL_N signal, and thus, the SVC firmware 23a detects that there is a circuit failure in which the OT_KILL_N signal is stuck at HIGH. Then, the SVC firmware 23a ends the circuit failure detection processing regarding the OT_KILL_N signal.

On the other hand, when the SVC firmware 23a determines that the signal level in the state register 312 for OWN_KILL_N signal in the SVC#1 is not "1" (NO in Step S46), the SVC firmware 23a detects that the OWN_KILL_N signal is normal (Step S48). Then, the SVC firmware 23a ends the circuit failure detection processing regarding the OT_KILL_N signal.

According to the first embodiment, in the SVC 3, the state register 311 holds the signal level of the signal outputted from the SVC 2 using the signal line 41. In the SVC 2, the failure detection section 231 inputs a signal of a predetermined level to the signal line 41 and, when the signal level of the signal held in the state register 311 does not match the inputted signal level, a circuit failure in which a signal is stuck at a particular level is detected. In the above-described configuration, the failure detection section 231 uses the signal level of the signal outputted using the same signal line 41 in performing comparison with the inputted signal level to detect mismatch from the inputted signal level. Thus, the failure detection section 231 may detect a circuit failure in which a signal is stuck at a level different from the signal level of the inputted signal to the signal line 41 in a simple manner.

Moreover, according to the first embodiment, the failure detection section 231 executes detection of a circuit failure in which a signal is stuck at a particular level on a periodic or non-periodic basis. In the above-described configuration, the failure detection section 231 is configured to execute detection of a circuit failure in which a signal is stuck at a particular level on a periodic or non-periodic basis, even while the system is operated, and therefore, when such a circuit failure is not detected, the signal level of the signal is considered reliable. Accordingly, when the SVC 2 detects a defect in the SVC 3, initialization may be reliably performed in the SVC 3 because the initialization signal outputted from the SVC 2 is reliable.

Second Embodiment

Incidentally, in the RAID system 9 according to the first embodiment, a case where the SVC firmware 23a of the SVC 2 detects a circuit failure in which the OT_KILL_P signal or the OT_KILL_N signal is stuck at a particular level has been described. However, the RAID system 9 is not limited thereto, but may be configured to specify, after detecting a failure, a failure position of the detected circuit failure. In a second embodiment, a case where the RAID system 9 specifies the failure position of a circuit failure in which the OT_KILL_P signal or the OT_KILL_N signal is stuck at a particular level will be described.

Configuration of Raid System According to Second Embodiment

Figure 6:
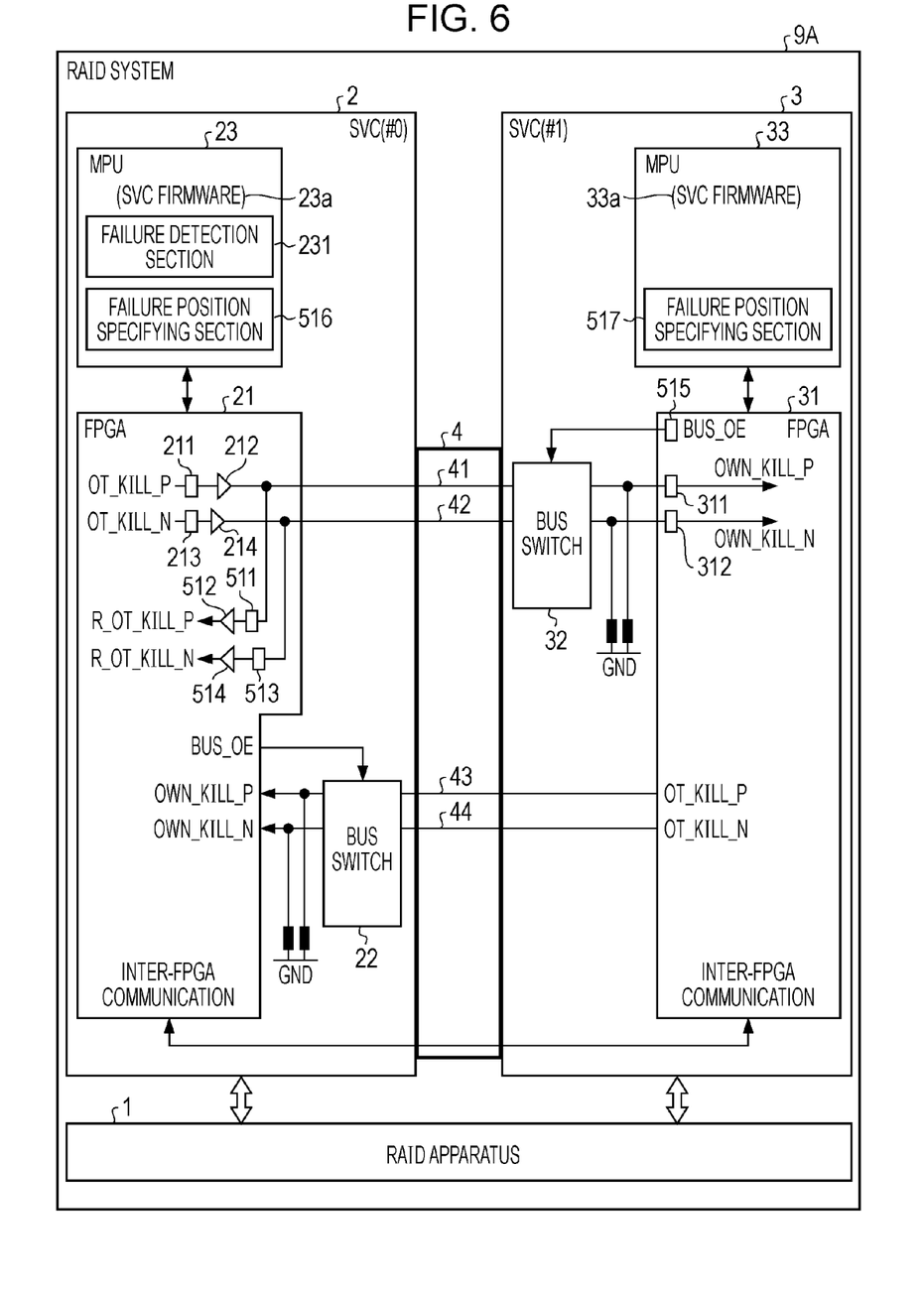
FIG. 6 is a diagram illustrating a hardware configuration of a RAID system according to a second embodiment.

FIG. 6 is a diagram illustrating a hardware configuration of a RAID system according to the second embodiment. Note that the same components as those of the RAID system 9 illustrated in FIG. 1 are denoted by the same reference characters as those in FIG. 1, and the description of the configuration and operation of each of the same components will not be repeated. The second embodiment is different from the first embodiment in that a loop back state register 511 and a buffer 512 are added to the signal line 41 of the FPGA 21 and a loop back state register 513 and a buffer 514 are added to the signal line 42 of the FPGA 21. Another difference of the second embodiment from the first embodiment is that a control register 515 is added to the FPGA 31 in the SVC 3. A still another difference of the second embodiment from the first embodiment is that a failure position specifying section 516 is added to the MPU 23 and a failure position specifying section 517 is added to the MPU 33.

The loop back state register 511 makes a signal inputted to signal line 41 loop to be held. The signal obtained by looping back the signal inputted to the signal line 41 and outputted will be hereinafter referred to as a "R_OT_KILL_P signal." That is, the loop back state register 511 holds the signal level controlled by the SVC firmware 23a regarding the OT_KILL_P signal. Note that loop back is performed at a point of the signal line 41 located immediately before a point thereof where the signal inputted to the signal line 41 goes out of the FPGA 21.

The buffer 512 is used when the voltage of an entire transmission path of the signal line 41 is raised such that a sufficient amount of current passes therethrough.

The loop back state register 513 loops back a signal inputted to the signal line 42 and holds it. The signal obtained by looping back the signal inputted to the signal line 42 and outputted will be hereinafter referred to as a "R_OT_KILL_N signal." That is, the loop back state register 513 holds the signal level controlled by the SVC firmware 23a for the OT_KILL_N signal. Note that loop back is performed at a point of the signal line 42 located immediately before a point thereof where the signal inputted to the signal line 42 goes out of the FPGA 21.

The buffer 514 is used when the voltage of an entire transmission path of the signal line 42 is raised such that a sufficient amount of current passes therethrough.

The control register 515 is a register used when the BUS_OE signal is controlled by the SVC firmware 33a.

When a circuit failure in which the OT_KILL_P signal is stuck at the high level is detected, the failure position specifying section 516 and the failure position specifying section 517 specify the failure position of the detected circuit failure.

For example, the failure position specifying section 516 instructs the failure position specifying section 517 to cause the bus switch 32 in the SVC 3 to be in a disconnection state. The failure position specifying section 517 then controls the BUS_OE signal to a disconnection state to put the bus switch 32 into a disconnection state using the control register 515. The failure position specifying section 517 refers to the state register 311 and determines whether or not the signal level of the OWN_KILL_P signal is the low level. When the failure position specifying section 517 determines that the signal level of the OWN_KILL_P signal is the low level, the failure position specifying section 517 determines that there is a circuit failure in the SVC 2. That is, since, when the OT_KILL_P signal is stuck at the high level, the bus switch 32 in the SVC 3 is in a disconnection state and it is determined that the state register 311 of the OWN_KILL_P signal is the low level, it is determined that the SVC 3 is normal and there is a circuit failure in the SVC 2. As an example of a circuit failure in the SVC 2, there is a case where an output pin for the OT_KILL_P signal is in failure. On the other hand, when the failure position specifying section 517 determines that the signal level of the OWN_KILL_P signal is the high level, the failure position specifying section 517 determines that there is a circuit failure in the SVC 3. That is, since, when the OT_KILL_P signal is stuck at the high level, since it is determined, in spite of the bus switch 32 in the SVC 3 being in a disconnection state, that the state register 311 of the OWN_KILL_P signal is the high level, it is determined that there is a circuit failure in the SVC 3. As an example of a circuit failure of the SVC 3, there is a case where the bus switch 32 is in failure.

Note that specifying, when there is a circuit failure in which the OT_KILL_P signal is stuck at the high level, the failure position of the circuit failure has been described, and specifying, when there is a circuit failure in which the OT_KILL_N signal is stuck at the high level, the failure position of the circuit failure is performed following a similar flow to that described above. Therefore, the description thereof will be omitted.

It has been described that the failure position specifying section 517 in the SVC 3 specifies the failure position of a circuit failure. However, the failure position specifying section 516 in the SVC 2 may perform inter-FPGA communication with the failure position specifying section 517 in the SVC 3 to specify the failure position of a circuit failure. For example, the failure position specifying section 516 in the SVC 2 may instruct the failure position specifying section 517 to cause the bus switch 32 in the SVC 3 to be in a disconnection state, and then, request for the signal level in the state register for the OWN_KILL_P signal using inter-FPGA communication. The failure position specifying section 516 then may determine whether or not the signal level of the OWN_KILL_P signal obtained through inter-FPGA communication is the low level.

When a circuit failure in which the OT_KILL_P signal is stuck at the low level is detected, the failure position specifying section 516 and the failure position specifying section 517 specify the failure position of the circuit failure.

For example, the failure position specifying section 516 inputs a signal having a high-level voltage to the signal line 41 using the control register 211. That is, the failure position specifying section 516 controls the OT_KILL_P signal to the high level. The failure position specifying section 516 instructs the failure position specifying section 517 to cause the bus switch 32 in the SVC 3 to be in a disconnection state. The failure position specifying section 517 then controls the BUS_OE signal to a disconnection state using the control register 515. A reason why the bus switch 32 in the SVC 3 is put into a disconnection state is to reduce influence of the bus switch 32 when specifying the failure position. The failure position specifying section 516 determines whether or not the signal level of the signal held in the loop back state register 511 matches the high level, which is the inputted signal level. When the failure position specifying section 516 determines that the signal level of the signal held in the loop back state register 511 matches the high level, which is the inputted signal level, the failure position specifying section 516 determines that there is a circuit failure in the SVC 3. That is, since, when the OT_KILL_P signal is stuck at the low level, the inputted high level in the SVC 2 matches the signal level of the looped back signal, it is determined that the SVC 2 is normal and there is a circuit failure in the SVC 3. On the other hand, when the failure position specifying section 516 determines that the signal level of the signal held in the loop back state register 511 does not match the high level, which is the inputted signal level, the failure position specifying section 516 determines that there is a circuit failure in the SVC 2. That is, when the OT_KILL_P signal is stuck at the high level, since the inputted high level in the SVC 2 does not match the signal level of the looped back signal, it is determined that there is a circuit failure in the SVC 2.

Note that specifying, when there is a circuit failure in which the OT_KILL_P signal is stuck at the low level, the failure position of the circuit failure has been described, and specifying, when there is a circuit failure in which the OT_KILL_N signal is stuck at the low level, the failure position of the circuit failure is performed following a similar flow to that described above. Therefore, the description thereof will be omitted.

Figure 7:
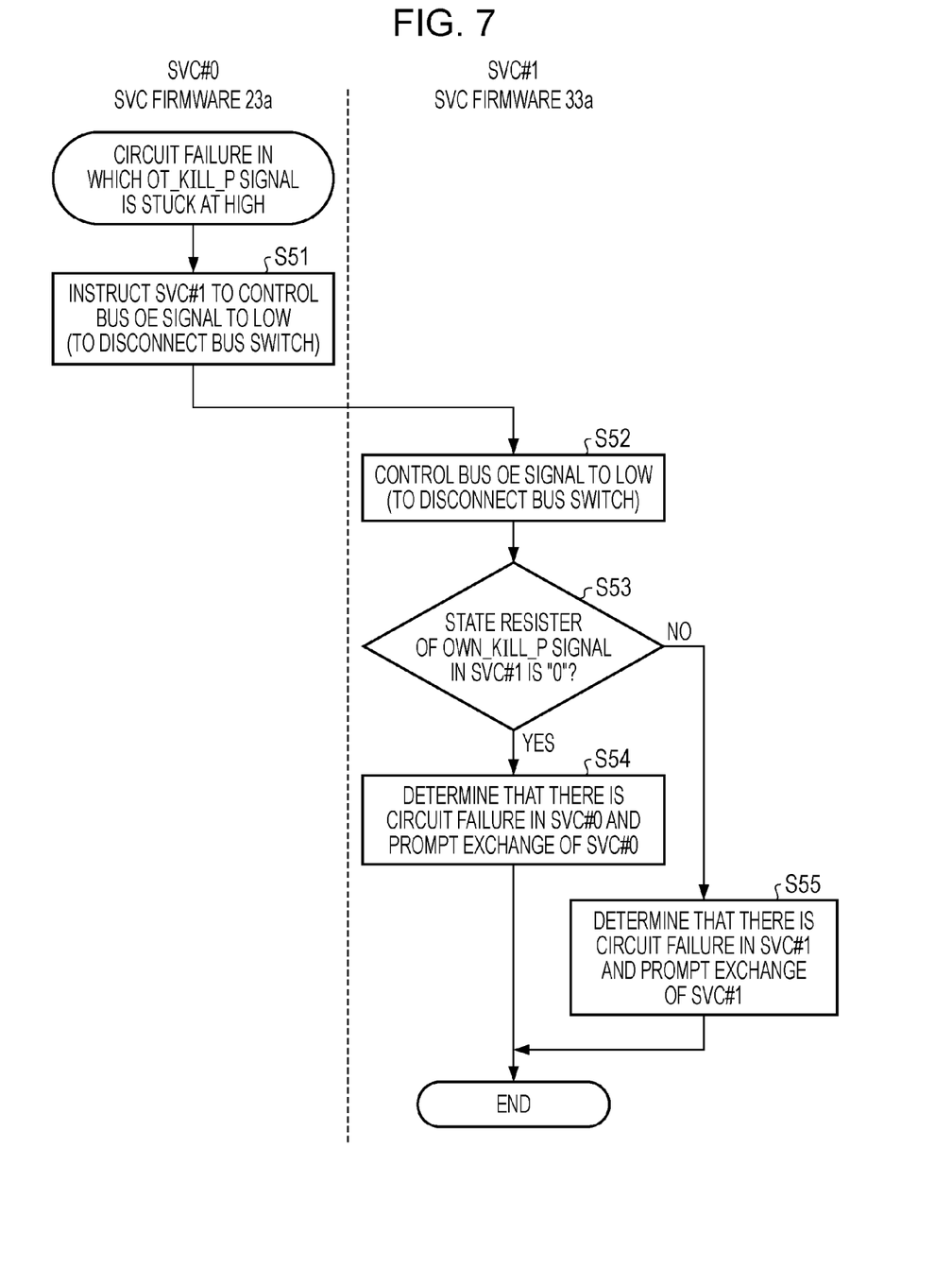
FIG. 7 is a diagram illustrating a sequence of failure position specifying when there is a circuit failure in which OT_KILL_P signal is stuck at HIGH.

Sequence of Failure Position Specifying when there is Failure in which OT_KILL_P Signal is Stuck at High Next, a sequence of specifying the failure position of a circuit failure in which the OT_KILL_P signal is stuck at the high level (which will be hereinafter referred to as "HIGH" in short) in the RAID system 9A according to the second embodiment will be described with reference to FIG. 7. FIG. 7 is a diagram illustrating a sequence of specifying the failure position of a circuit failure in which the OT_KILL_P signal is stuck at HIGH. Note that, in FIG. 7, the SVC 2 is denoted by SCV#0 and the SVC 3 is denoted by SVC#1, the descriptions of which will be given below. Assume that the SVC firmware 23a in the SVC#0 has detected a circuit failure in which the OT_KILL_P signal is stuck at HIGH.

In the SVC#0, the SVC firmware 23a (the failure position specifying section 516) instructs the SVC#1 to control the BUS_OE signal to LOW (Step S51). This step is performed to put the bus switch 32 in the SVC#1 into a disconnection state.

In the SVC#1, the SVC firmware 33a controls the BUS_OE signal to LOW to put the bus switch 32 into a disconnection state (Step S52). Subsequently, the SVC firmware 33a determines whether or not the signal level in the state register 311 for the OWN_KILL_P signal in the SVC#1 is "0" (Step S53).

When the SVC firmware 33a determines that the signal level in the state register 311 for the OWN_KILL_P signal is "0" (YES in Step S53), the SVC firmware 33a determines that there is a circuit failure in the SVC#0 and prompt exchange of the SVC#0 (Step S54). That is, since the bus switch 32 in the SVC#1 is in a disconnection state and the signal level in the state register 311 for the OWN_KILL_P signal is low, it is determined that the SVC#1 is normal and there is a failure in the SVC#0. Then, the SVC firmware 33a ends the failure position specifying processing.

On the other hand, when the SVC firmware 33a determines that the signal level of the state register 311 of the OWN_KILL_P signal is not "0" (NO in Step S53), the SVC firmware 33a determines that there is a circuit failure in the SVC#1 and prompt exchange of the SVC#1 (Step S55). That is, since the signal level in the state register 311 for the OWN_KILL_P signal is high in spite of the bus switch 32 in the SVC#1 being in a disconnection state, it is determined that there is a failure in SVC#1. Then, the SVC firmware 33a ends the failure position specifying processing, and the SVC firmware 23a ends the failure position specifying processing.

Figure 8:
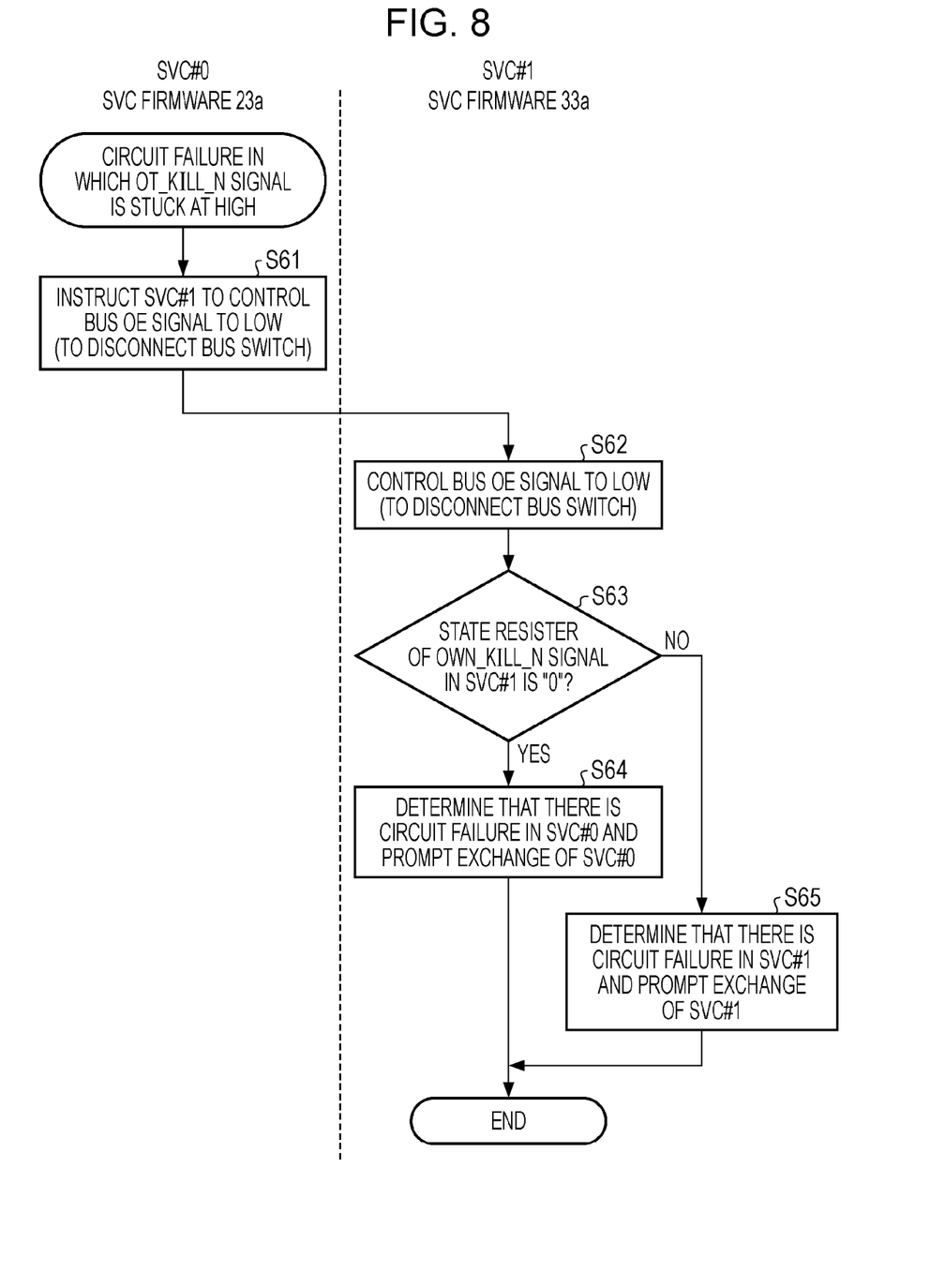
FIG. 8 is a diagram illustrating a sequence of failure position specifying when there is a circuit failure in which OT_KILL_N signal is stuck at HIGH.

Sequence of Failure Position Specifying when there is Failure in which OT_KILL_N Signal is Stuck at High Next, when there is a circuit failure in which the OT_KILL_N signal is stuck at the high level (which will be hereinafter referred to as "HIGH" in short), a sequence of specifying the failure position of the circuit failure in the RAID system 9A according to the second embodiment will be described with reference to FIG. 8. FIG. 8 is a diagram illustrating a sequence of specifying the failure position of a circuit failure in which the OT_KILL_N signal is stuck at HIGH. Note that, in FIG. 8, the SVC 2 is denoted by SCV#0 and the SVC 3 is denoted by SVC#1, the descriptions of which will be given below. Assume that the SVC firmware 23a in the SVC#0 has detected a circuit failure in which the OT_KILL_N signal is stuck at HIGH.

In the SVC#0, the SVC firmware 23a (the failure position specifying section 516) instructs the SVC#1 to control the BUS_OE signal to LOW (Step S61). This step is performed to put the bus switch 32 in the SVC#1 into a disconnection state.

In the SVC#1, the SVC firmware 33a controls the BUS_OE signal to LOW to put the bus switch 32 into a disconnection state (Step S62). Subsequently, the SVC firmware 33a determines whether or not the signal level in the state register 312 for the OWN_KILL_N signal in the SVC#1 is "0" (Step S63).

When the SVC firmware 33a determines that the signal level in the state register 312 for the OWN_KILL_N signal is "0" (YES in Step S63), the SVC firmware 33a determines that there is a circuit failure in the SVC#0 and prompt exchange of the SVC#0 (Step S64). That is, since the bus switch 32 in the SVC#1 is in a disconnection state and the state register 312 of the OWN_KILL_N signal is the low level, it is determined that the SVC#1 is normal and there is a failure in the SVC#0. Then, the SVC firmware 33a ends the failure position specifying processing.

On the other hand, when the SVC firmware 33a determines that the signal level of the state register 312 of the OWN_KILL_N signal is not "0" (NO in Step S63), the SVC firmware 33a determines that there is a circuit failure in the SVC#1 and prompt exchange of the SVC#1 (Step S65). That is, since the state register 312 of the OWN_KILL_N signal is the high level in spite of the bus switch 32 in the SVC#1 being in a disconnection state, it is determined that there is a failure in SVC#1. Then, the SVC firmware 33a ends the failure position specifying processing, and the SVC firmware 23a ends the failure position specifying processing.

Figure 9:
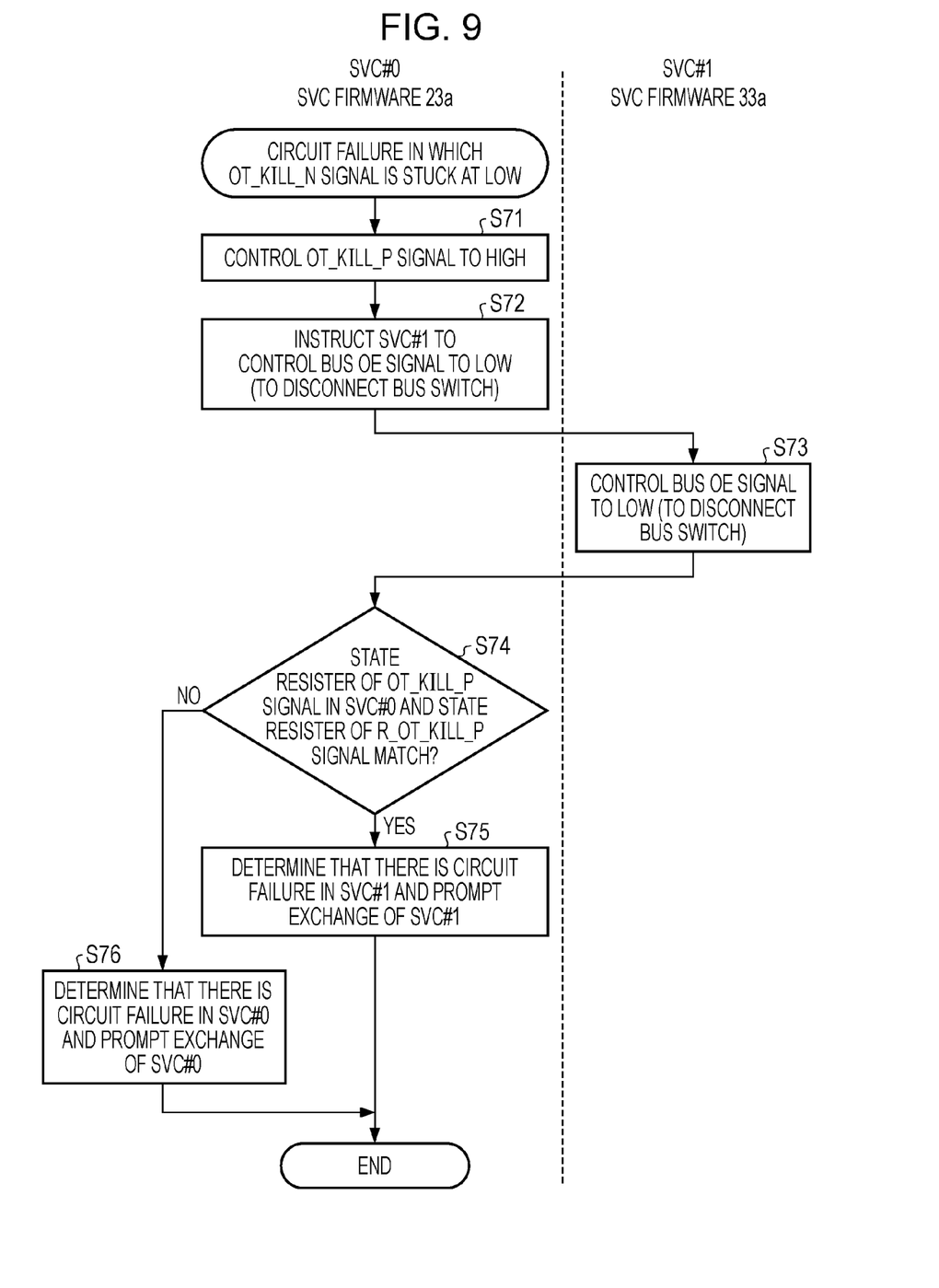
FIG. 9 is a diagram illustrating a sequence of failure position specifying when there is a circuit failure in which OT_KILL_P signal is stuck at LOW.

Sequence of Failure Position Specifying when there is Failure in which OT_KILL_P Signal is Stuck at Low Next, a sequence of specifying, when there is a circuit failure in which the OT_KILL_P signal is stuck at the low level (which will be hereinafter referred to as "LOW" in short), the failure position of the circuit failure in the RAID system 9A according to the second embodiment will be described with reference to FIG. 9. FIG. 9 is a diagram illustrating a sequence of specifying the failure position of a circuit failure in which the OT_KILL_P signal is stuck at LOW. Note that, in FIG. 9, the SVC 2 is denoted by SCV#0 and the SVC 3 is denoted by SVC#1, the descriptions of which will be given below. Assume that the SVC firmware 23a in the SVC#0 has detected a circuit failure in which the OT_KILL_P signal is stuck at LOW.

In the SVC#0, the SVC firmware 23a (the failure position specifying section 516) controls the OT_KILL_P signal to HIGH (Step S71). For example, the SVC firmware 23a inputs HIGH to the signal line 41 using the control register 211. Subsequently, the SVC firmware 23a gives an instruction to the SVC#1 to control the BUS_OE signal to LOW (Step S72). This step is performed to reduce influence of the bus switch 32 in the SVC#1.

In the SVC#1, the SVC firmware 33a controls the BUS_OE signal to LOW to put the bus switch 32 into a disconnection state (Step S73).

Subsequently, in the SVC#0, the SVC firmware 23a determines whether or not the signal level of the OT_KILL_P signal in the SVC#0 and the signal level of the state register of the R_OT_KILL_P signal match each other (Step S74). That is, the SVC firmware 23a determines whether or not the signal level of the signal held in the loop back state register 511 matches the high level, which is the inputted signal level.

When the signal level of the OT_KILL_P signal in the SVC#0 and the signal level of the state register of the R_OT_KILL_P signal match each other (YES in Step S74), the SVC firmware 23a determines that there is a circuit failure in the SVC#1 and prompts exchange of the SVC#1 (Step S75). That is, since the signal level of a high level inputted in the SVC#0 and the signal level of the looped back signal in the SVC#0 match each other, it is determined that the SVC#0 is normal and there is a failure in the SVC#1. Then, the SVC firmware 23a ends the failure position specifying processing.

When the signal level of the OT_KILL_P signal and the signal level of the state register of the R_OT_KILL_P signal, in the SVC#0, do not match each other (NO in Step S74), the SVC firmware 23a determines that there is a circuit failure in the SVC#0 and prompts exchange of the SVC#0 (Step S76). That is, since the signal level of a high level inputted in the SVC#0 and the signal level of the looped back signal in the SVC#0 do not match each other, it is determined that there is a failure in the SVC#0. Then, the SVC firmware 23a ends the failure position specifying processing.

Figure 10:
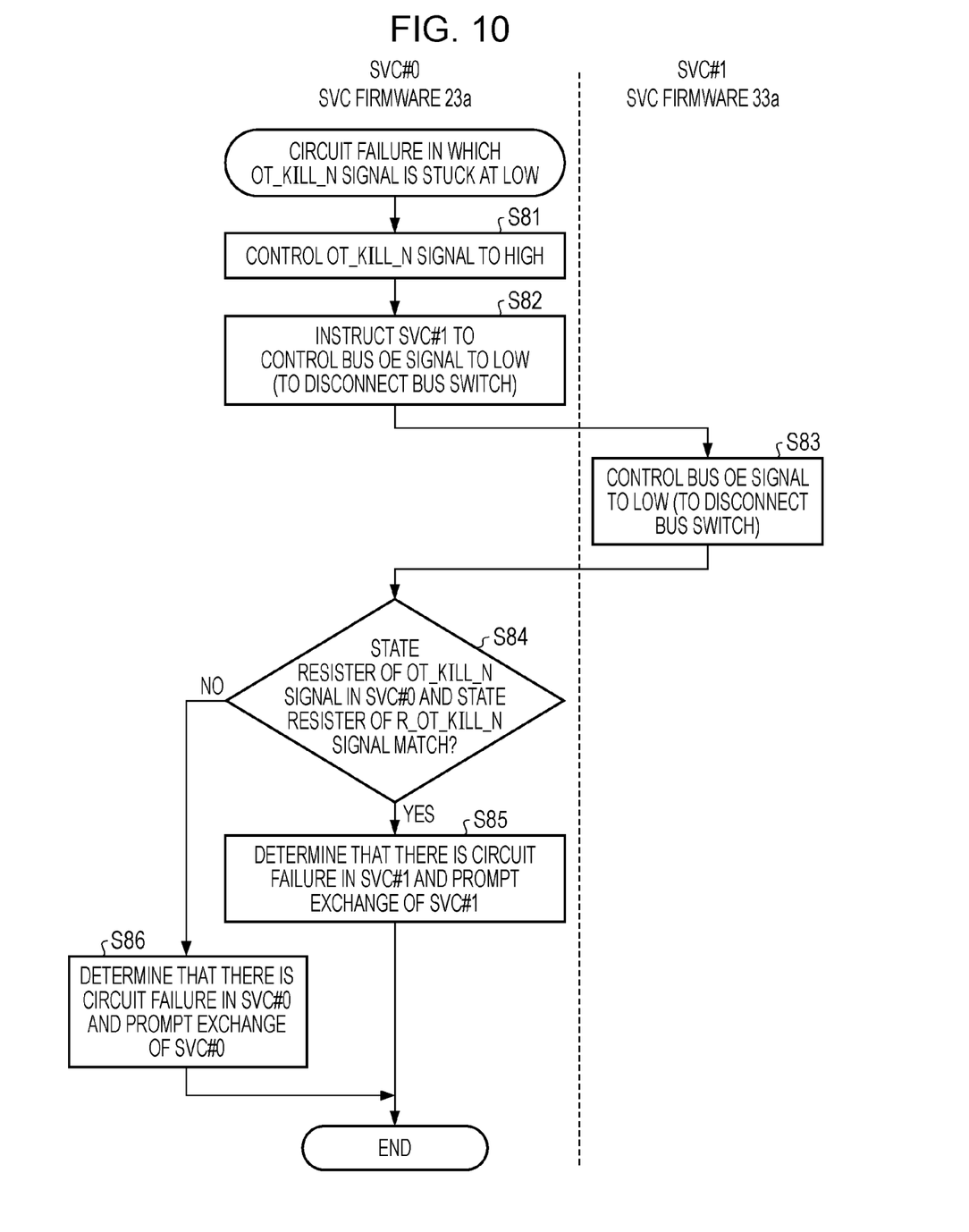
FIG. 10 is a diagram illustrating a sequence of failure position specifying when there is a circuit failure in which OT_KILL_N signal is stuck at LOW.

Sequence of Failure Position Specifying when there is Failure in which OT_KILL_N Signal is Stuck at Low Next, a sequence of specifying, when there is a circuit failure in which the OT_KILL_N signal is stuck at the low level (which will be hereinafter referred to as "LOW" in short), the failure position of the circuit failure in the RAID system 9A according to the second embodiment will be described with reference to FIG. 10. FIG. 10 is a diagram illustrating a sequence of specifying, when there is a circuit failure in which the OT_KILL_N signal is stuck at LOW, the failure position of the circuit failure. Note that, in FIG. 10, the SVC 2 is denoted by SCV#0 and the SVC 3 is denoted by SVC#1, the description of which will be given below. Assume that the SVC firmware 23a in the SVC#0 has detected a circuit failure in which the OT_KILL_N signal is stuck at LOW.

In the SVC#0, the SVC firmware 23a (the failure position specifying section 516) controls the OT_KILL_N signal to HIGH (Step S81). For example, the SVC firmware 23a inputs HIGH to the signal line 42 using the control register 213. Subsequently, the SVC firmware 23a gives an instruction to the SVC#1 to control the BUS_OE signal to LOW (Step S82). This step is performed to reduce influence of the bus switch 32 in the SVC#1.

In the SVC#1, the SVC firmware 33a controls the BUS_OE signal to LOW to put the bus switch 32 into a disconnection state (Step S83).

Subsequently, in the SVC#0, the SVC firmware 23a determines whether or not the signal level of the OT_KILL_N signal in the SVC#0 and the signal level in the state register for the R_OT_KILL_N signal match each other (Step S84). That is, the SVC firmware 23a determines whether or not the signal level of the signal held in the loop back state register 513 matches the high level, which is the inputted signal level.

When the signal level of the OT_KILL_N signal in the SVC#0 and the signal level in the state register for the R_OT_KILL_N signal match each other (YES in Step S84), the SVC firmware 23a determines that there is a circuit failure in the SVC#1 and prompts exchange of the SVC#1 (Step S85). That is, since the high level of the signal inputted in the SVC#0 and the signal level of the looped back signal match each other, it is determined that the SVC#0 is normal and there is a circuit failure in the SVC#1. Then, the SVC firmware 23a ends the failure position specifying processing.

When the signal level of the OT_KILL_N signal in the SVC#0 and the signal level in the state register for the R_OT_KILL_N signal do not match each other (NO in Step S84), the SVC firmware 23a determines that there is a circuit failure in the SVC#0 and prompts exchange of the SVC#0 (Step S86). That is, since the signal level of high level inputted in the SVC#0 and the signal level of the looped back signal do not match each other, it is determined that there is a failure in the SVC#0. Then, the SVC firmware 23a ends the failure position specifying processing.

According to the second embodiment, the SVC 3 further includes the bus switch 32 that turns on and off output of a signal passing through the signal line 41 toward the state register 311. When it is detected that there is a defect in which a signal is stuck at a particular signal level, the SVC 2 turns off the bus switch 32 (to be in a disconnection state). Then, the SVC 2 specifies whether there is a defect in the SVC 2 or the SVC 3 using the signal level held in the state register 311 and the signal level held in the loop back state register 511. In the above-described configuration, when it is detected that there is a defect in which a signal is stuck at a particular signal level, the SVC 2 determines whether there is a defect in the SVC 2 or the SVC 3, and therefore, SVC that is to be exchanged may be determined and the system may be smoothly operated.

Also, according to the second embodiment, when it is detected that there is a defect in which a signal is stuck at the high level, the SVC 2 puts the bus switch 32 into an off state (a disconnection state). When the signal level of the signal held in the state register 311 is the high level, the SVC 2 specifies that there is a defect in the SVC 3. On the other hand, when the signal level of the signal held in the state register 311 is the low level, the SVC 2 specifies that there is a defect in the SVC 2. In the above-described configuration, the SVC 2 specifies, using the disconnection state of the bus switch 32 in the SVC 3, an SVC in which there is a defect on the basis of whether the low level that is to be held in a disconnection state is held. Accordingly, when there is a defect in which a signal is stuck at the high level, the SVC 2 may specify an SVC in which there is a defect in a simple manner.

Moreover, according to the second embodiment, when there is a defect in which a signal is stuck at the low level, the SVC 2 inputs a high level signal to the signal line 41 to put the bus switch 32 into an off state (a disconnection state). Then, when the signal level of the signal held in the loop back state register 511 does not match the inputted signal level, the SVC 2 specifies that there is a defect in the SVC 2. On the other hand, when the signal level of the signal held in the loop back state register 511 matches the inputted signal level, the SVC 2 specifies that there is a defect in the SVC 3. In the above-described configuration, the SVC 2 specifies, using the loop back state register 511 in the SVC 2, an SVC in which there is a defect on the basis of whether the high level, which is the inputted signal level, is held in the loop back state register 511. Accordingly, when there is a defect in which a signal is stuck at the low level, the SVC 2 may specify a SVC in which there is a defect in a simple manner.

Other Embodiments

Note that, in the first and second embodiments, the RAID systems 9 and 9A are configured to perform circuit failure detection on the signal lines 41 and 42 to detect a circuit failure in which a signal is stuck at a particular signal level and specify the failure position of the detected circuit failure. However, a system according to each of the above-described embodiments is not limited to a RAID system but may be any system which performs mutual communication between duplicated apparatuses using a signal line.

In the first and second embodiments, the RAID systems 9 and 9A are configured to perform circuit failure detection on the signal lines 41 and 42 in which an initialization signal is inputted to detect a circuit failure in which a signal is stuck at a particular signal level and specify the failure position of the detected circuit failure. However, the RAID systems 9 and 9A may be configured to perform circuit failure detection on a signal line in which some signal other than an initialization signal is inputted to detect a circuit failure in which a signal is stuck at a particular signal level and specify the failure position of the detected circuit failure. Thus, in each of the RAID systems 9 and 9A, detection of a circuit failure in which a signal is stuck at a particular signal level and specifying of a failure position may be performed generally.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
   a first apparatus and a second apparatus configured to perform communication therebetween using a signal line, wherein
   the first apparatus includes,
      a holding section configured to hold a signal level of a signal outputted from the second apparatus using the signal line, and
   the second apparatus includes,
      a detection section configured to detect a failure in which a signal level does not change from a certain signal level when the detection section detects that the signal level is not correspondent with a predetermined level, the signal level being held in the holding section after a signal of the predetermined level is inputted to the signal line by the second apparatus.

2. The system according to claim 1,
   wherein the first apparatus further includes,
      a switch configured to turn on and off output of a signal passing through the signal line toward the holding section, and
   the second apparatus further includes,
      a loop-back holding section configured to loop back the signal level of the signal inputted to the signal line and hold the signal level, and
      a defect specifying section configured to turn off, when a defect in which the signal level does not change from a particular signal level is detected by the detection section, the switch, and then, specify whether there is a defect in the first apparatus or the second apparatus using the signal level held in the holding section or the signal level held in the loop-back holding section.

3. The system according to claim 2,
   wherein, in the case where a defect in which the signal level does not change from a high signal level is detected by the detection section, the specifying section turns off the switch, specifies, when the signal level of the signal held in the holding section is a high level, that there is a defect in the first apparatus, and specifies, when the signal level of the signal held in the holding section is a low level, that there is a defect in the second apparatus.

4. The system according to claim 2, wherein, in the case where a defect in which the signal level does not change from a low signal level is detected by the detection section, the defect specifying section inputs a high level signal to the signal line, turns off the switch, specifies, when the signal level of the signal held in the loop-back holding section does not match the inputted signal level, that there is a defect in the first apparatus, and specifies, when the signal level of the signal held in the loop-back holding section matches the inputted signal level, that there is a defect in the second apparatus.

5. The system according to claim 1, wherein the detection section executes the defect detection on a periodic or non-periodic basis.

6. A method for specifying a defect position for use in a system including a first apparatus and a second apparatus configured to perform mutual communication therebetween using a signal line, the method comprising:
    inputting a signal of a predetermined level to the signal line by the second apparatus,
    holding a signal level of the signal, by the first apparatus, outputted from the second apparatus using the signal line, and
    detecting by the second apparatus, when the signal level of the signal held is not correspondent with the inputted level, a defect in which the signal level does not change from a particular signal level.

\* \* \* \* \*